Oct. 8, 1968  W. G. REED  3,404,763
INERTIA-APPLIED WORKPIECE DRIVER
Filed March 1, 1967  3 Sheets-Sheet 1

INVENTOR.
WILLIAM G. REED
BY *Richard W. Treverton*
ATTORNEY

Oct. 8, 1968 W. G. REED 3,404,763
INERTIA-APPLIED WORKPIECE DRIVER
Filed March 1, 1967. 3 Sheets-Sheet 2 though only at one side of the axis, as shown in FIG. 1.

United States Patent Office 3,404,763
Patented Oct. 8, 1968

3,404,763
INERTIA-APPLIED WORKPIECE DRIVER
William G. Reed, Fairport, N.Y., assignor to The Gleason Works, Rochester, N.Y., a corporation of New York
Filed Mar. 1, 1967, Ser. No. 619,744
11 Claims. (Cl. 192—103)

ABSTRACT OF THE DISCLOSURE

A rolling quench machine for generally cylindircal parts has axially spaced work-engaging centers, one of which is carried by a work drive spindle and the other by the machine frame, the spindle being journaled in a housing that is movable, axially of the spindle, to open or close the centers. A ring-shaped work driver carried by the spindle is guided by a pin-and-slot connection for helical motion relative to the spindle, the helical inclination of the slots being in the sense that upon the start of spindle rotation the inertia of the driver tends to effect movement of it, axially of the spindle, to grip a workpiece that is between the centers. A torsion spring acting between the spindle and the driver also acts through the pin-and-slot connection to press the driver against the work as the centers are closed.

---

The present invention relates to a machine, for example a rolling quench machine for generally cylindrical parts, which supports workpieces between axially aligned centers and has a workpiece driver adjacent one center for engaging the adjacent end face of the workpiece.

In a known machine of this kind, widely used for quenching shank-type automobile axle drive pinions during the heat treatment thereof, the center adjacent the workpiece driver is slidable axially in a drive spindle and is backed by a spring which holds the centers firmly engaged with a workpiece between them. The workpiece driver is carried by the spindle which is journaled in a housing movable on the frame, axially of the spindle, to open the centers for receiving or releasing a workpiece and to close the centers for engaging a workpiece. While the workpiece is being rotated between the centers, pressure rollers act against its shank before and during the application of the quenching medium, to hold it against distortion.

The object of the invention is to improve the operation of the machine by increasing the effectiveness of the workpiece driver and the accuracy of the centering action by the work-engaging centers. As applied to rolling quench machines, these objectives are to further reduce distortion of workpieces undergoing heat treatment.

A preferred embodiment of the invention is shown in the accompanying drawings, wherein.

Figure 1:
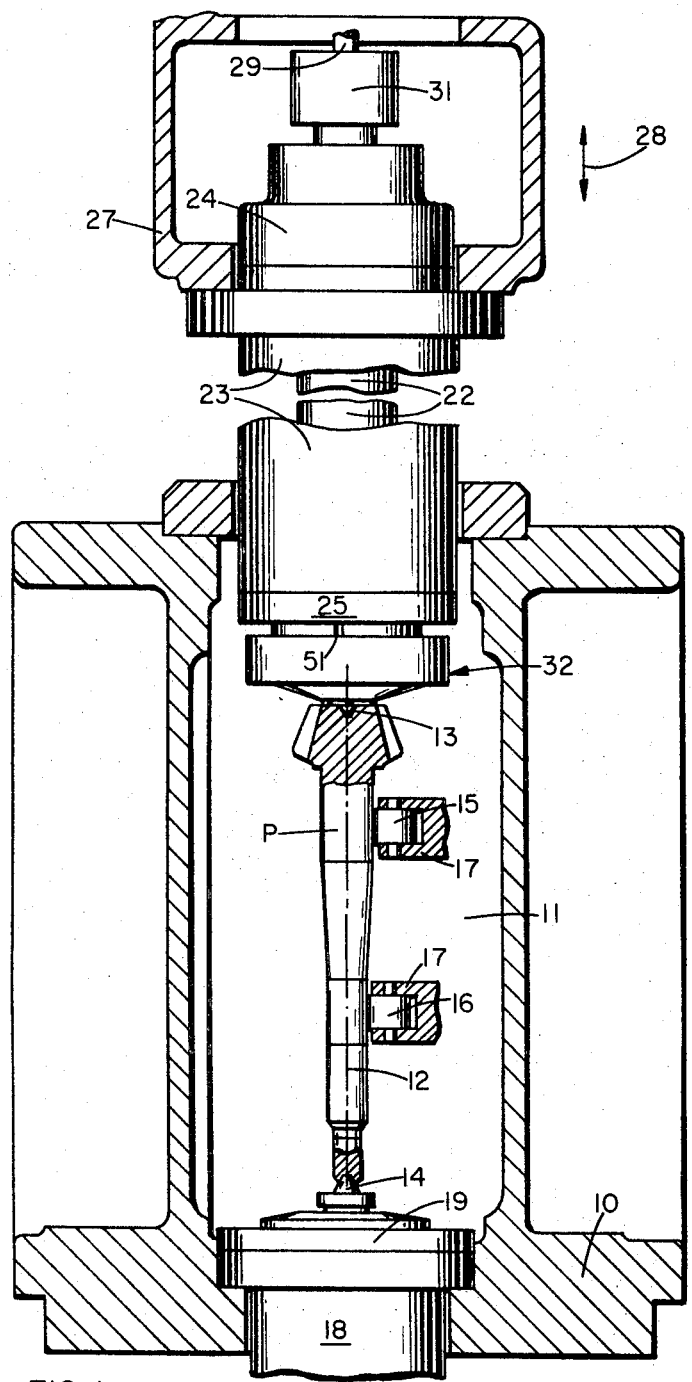
FIG. 1 is a vertical section view through the work supporting and drive portion of the machine.

The machine is of the general kind shown in Patent No. 2,699,412 granted Jan. 1, 1955, to R. V. Adair et al. to which reference may be had for the machine structure beyond that immediately related to the present invention. The frame 10 of the machine has a chamber 11 in which quenching liquid is applied to the workpiece, in this case an automobile axle drive pinion P, while it is being rotated about its axis 12, supported by aligned upper and lower centers 13 and 14. Rollers 15 and 16, carried by suitable structure 17, shown herein only fragmentarily, are adapted to bear against axially spaced cylindrical surfaces of the shank of the rotating workpiece, first to straighten the shank prior to quenching in the event it has distorted while being heated prior to its insertion in the quench machine, and, secondly, to hold the shank straight as the quenching in chamber 11 proceeds.

Center 14, whose conical upper end engages in a centering recess in the end of the workpiece shank, is journaled for rotation about axis 12 and held against axial motion by suitable bearing means supported in frame 10 by bearing retainer 18 and bearing cap 19. Center 13, whose conical lower end engages in a similar recess in the head of the workpiece, has a tapered shank 21 which fits with a driving wedge fit in a similarly tapered bore in a drive spindle 22 so that it moves as a unit with the spindle during operation of the machine. This is in distinction from the machine disclosed in the afore-mentioned patent, where the corresponding center is slidable in the spindle and is backed by a spring which presses it downwardly against the workpiece. The present arrangement, by eliminating sliding clearance between the spindle and the center, makes possible more highly accurate centering of the workpiece. The spindle is rotatable, also about axis 12, on upper and lower anti-friction bearings held in a bearing sleeve 23 by retainer cap rings 24 and 25. Only the lower set of these bearings, designated 26, is shown. Sleeve 23 is rigidly secured to a housing 27 which constitutes a slide movable on the frame axially of the spindle, as indicated by arrow 28. The housing supports a motor and reducting gear unit (not shown) whose output shaft 29 is connected to the spindle 22 by coupling 31.

Motion of the housing 27 in direction 28 on the frame 10 is effected by means (not shown herein but fully disclosed in the afore-mentioned patent) comprising a power driven cam and a spring, the latter being interposed between the cam and the housing to exert a constant downward pressure on the spindle thereby keeping the center 13 firmly engaged with the workpiece as the latter shrinks axially while being quenched.

Figure 3:
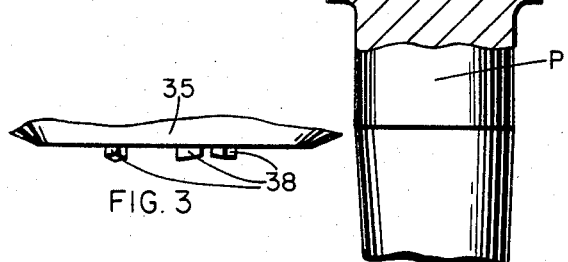
FIG. 3 is a fragmentary elevation of the work-engaging end of the workpiece driver.

The spindle 22 carries a work driving unit 32 which comprises an inner ring 33 screw-threaded to the spindle as indicated at 34, and a workpiece drive 35 of generally cup shape. The web of the workpiece driver has a central bore 36 through which the nose of the center 13 extends. The flange of the workpiece driver has an inner cylindrical surface 37 which is coaxial of the spindle 22 and ring 33 and is slidable angularly and axially on the outer cylindrical surface of the ring. On the lower face of the workpiece driver web are a plurality of teeth 38 adapted for driving engagement with the adjacent end face 39 of the workpiece. Preferably the teeth are hardened and are sharpened, as shown in FIG. 3, so that they may slightly indent the face 39 to provide a positive drive of the workpiece.

Figure 2:
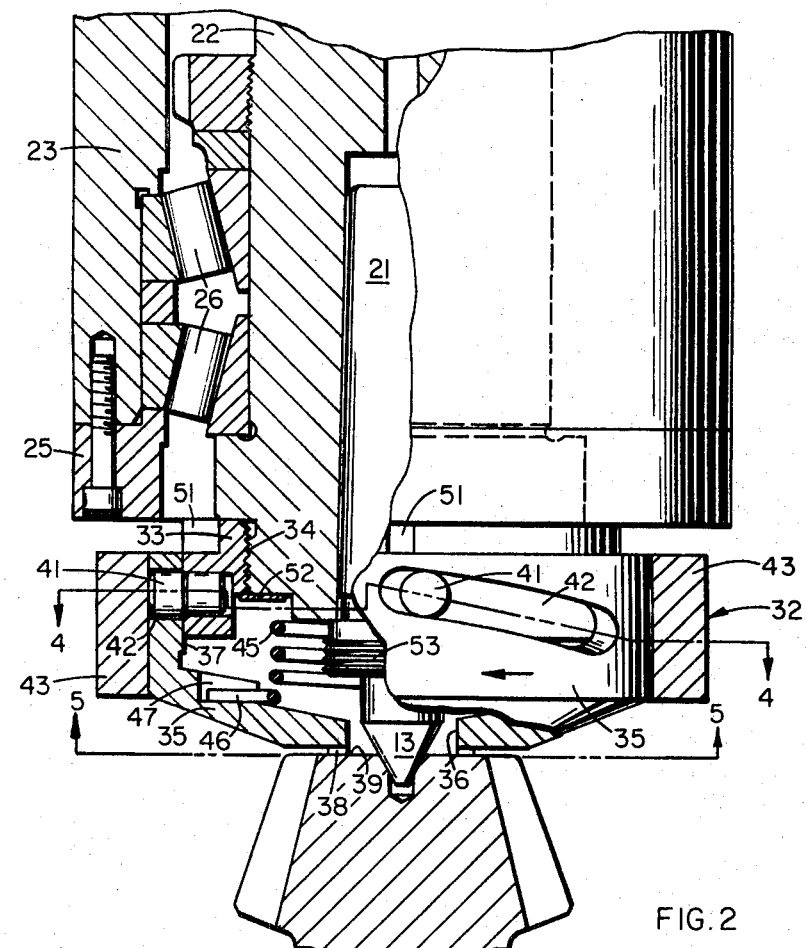
FIG. 2 is a vertical section on a larger scale through the workpiece driver and related parts.

The ring 33 and work piece driver 35 have cooperating helical guide formations which in the illustrated embodiment comprise a plurality of pins 41 (three in the illustrated embodiment) press-fitted into the ring and extending radially outwards therefrom, and a like number of helically inclined slots 42 in the flange of the workpiece driver, one pin engaging in each slot. The sense of the inclination of the slots is such that if the driver is held against rotation, rotation of ring 33 and pins 41 in the direction in which the workpiece P is to be rotated, will cause the driver to be moved axially toward the workpiece. Thus in the illustrated embodiment, where the spindle is to drive the workpiece clockwise (as viewed from above) the slots incline downwardly, at an angle of about 10° to the horizontal, from left to right as viewed from the outside, as in FIG. 2.

Figure 4:
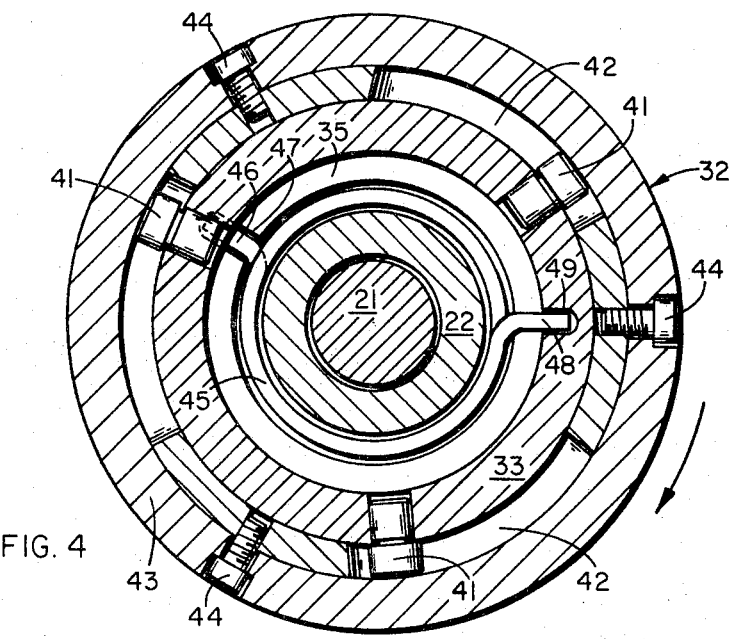
FIGS. 4 and 5 are respectively a cross-section, in plane 4—4 of FIG. 2, and a bottom plan view of the workpiece driver.
Figure 5:
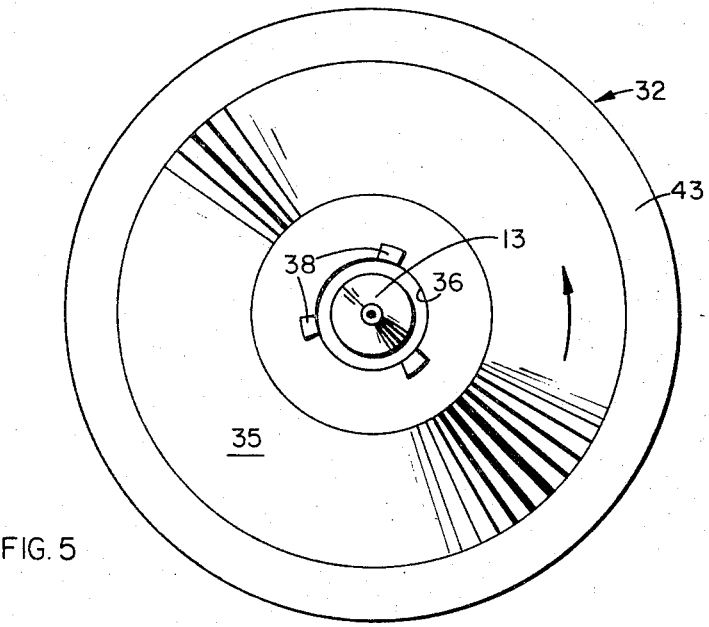

A ring 43 surrounds the workpiece driver 35 and is rigidly secured to it by screws 44, FIG. 4. This ring has two purposes: first to increase the moment of inertia of the workpiece driver, and second to shield the pins and slots, 41, 42. Upon removal of ring 43 the pins 41 may be readily pressed out of the ring 33 should disassembly of unit 32 be required for any reason.

A torsion spring 45 extends around the center 13 in radially spaced relation thereto, the helix axis of spring being substantially co-axial of the spindle 22. The lower end 46 of the spring is anchored to workpiece driver 35 by extending into a recess 47 therein. The opposite (upper) end 48 of the spring is similarly anchored to ring 33 by extending into recess 49 of the latter. The spring acts to urge rotation of the workpiece driver relative to the ring 33 in the direction opposite to that in which the workpiece is to be driven. That is, in the illustrated embodiment the springs acts to rotate the driver counterclockwise (looking down) relative to the ring, to bring the upper ends of slots 42 against pins 41, and, in so doing, because of the helical form of the slots, lowers the driver relative to the ring 33 and spindle 22.

The device 32 may be removed as a unit from the spindle 22 by unscrewing the ring 33 therefrom. To facilitate such removal, sockets 51 for a spanner wrench are provided at spaced intervals around the ring 33. In order to prevent accidental separation of spring 45 from the unit 32 after such removal, a washer 52 is disposed between the upper convolution of the spring and the shoulder of the ring 33 against which the washer is shown as bearing in FIG. 2. Screw thread 53 is formed on center 14 for engagement with a nut (not shown) for use in extracting the center from the spindle for reconditioning or repair.

In operation, while the spindle 22 is stationary and is elevated by housing 27 to open the centers 13, 14, the spring 45 acts in torsion against the workpiece driver 35 to lower it to its limit position relative to the spindle. A heated workpiece P is aligned with the centers, and the housing 27 and spindle are lowered to close the centers into engaged relation with the workpiece. As the spindle lowers the driver teeth 38 engage the workpiece surface 39 before the center 13 is fully engaged in the centering recess in workpiece, and as the lowering continues, the spindle and with it the pins 41 are lowered relative to the driver against the frictional resistance imposed by the lower walls of slots 42 against the pins, and, since the pins and slots require the workpiece driver to rotate (clockwise relative to the spindle as viewed from above) in order to permit the continued lowering of the pins, the lowering action is also opposed by the torsion spring and by the angular inertia of the pinion and the workpiece driver, including ring 43. Thus the driver teeth are pressed firmly against the face 39, establishing driving engagement of the workpiece driver with the workpiece.

After the lowering motion is completed so that the centers 13, 14 have been closed upon the workpiece, the spindle drive motor is started, rotating the spindle clockwise (as viewed from above). At this time again the inertia of the workpiece driver 35, including the ring 43, by resisting rotation, results in the pins 41 acting against the inclined slots 42 to drive the workpiece driver downwardly against the workpiece, further tending to impress the teeth 38 into the workpiece surface 39 to provide an effective drive. While the workpiece rotates, lateral pressure is applied to it by rollers 14 and 15, and this tends to brake the rotation, increasing the driving torque being applied by pins 41 against the lower walls of slots 42, and likewise increasing the axial pressure tending to press the workpiece driver teeth into workpiece surface 39. After the ensuing quenching operation, the spindle rotation is stopped and the housing 27 is raised to open the centers, releasing the workpiece for removal from chamber 11. Upon such opening of the centers the spring 45 again acts to lower the workpiece driver 35 relative to the spindle, bringing the pins 41 against the upper ends of slots 42.

Having now described the preferred embodiment of my invention and its mode of operation, what I claim is:

1. A machine, for example a rolling quench machine for generally cylindrical parts, having a frame supporting a first work-engaging center and also supporting a work drive spindle which is coaxial of said center and carries coaxially thereof a second work-engaging center, the spindle and first center being relatively movable, axially, to open the centers for receiving or releasing a workpiece or to close the centers for engaging a workpiece between them, and a workpiece driver carried by the spindle and engageable with the adjacent face of the workpiece for driving the latter upon rotation of the spindle, wherein the improvement comprises the driver being movable on the spindle both along and about the spindle axis, and there being cooperating helical guide formations on the spindle and driver, the sense of the helical inclination of said formations being such, relative to the direction of spindle rotation, that upon start of such rotation the inertia of the driver will tend to effect movement of it toward the first center, and a spring acting between the spindle and driver in a direction to urge helical motion of the driver toward said first center guided by said formations.

2. A machine according to claim 1 in which the second center is rigidly connected to the spindle for movement therewith.

3. A machine according to claim 1 in which the spring is arranged to act in torsion between the spindle and driver, and, through guidance by said guide formations, to urge helical motion of the driver relative to the spindle.

4. A machine according to claim 3 in which the spring is of helical form, extends around the second center, and has one end anchored relative to the spindle and the opposite end anchored relative to the driver.

5. A machine according to claim 1 in which said helical guide formations comprise a plurality of radially extending pins secured to one of said spindle and said driver, and the other one of said spindle and said driver having for each such pin a slot in which the pin is slidable, the slots being disposed helically around and along the axis of the spindle.

6. A machine according to claim 5 in which said pins extend radially outward from a ring secured to the spindle, and the slots are provided in a tubular flange of the driver which extends around the outer surface of said ring and is slidable thereon axially and angularly.

7. A machine according to claim 6 in which said slots and the radially outer faces of said pins are covered by an inertia ring detachably secured to the outer surface of said flange.

8. A machine according to claim 7 in which said pins are pressed into said ring secured to the spindle and are removable through said slots upon removal of said inertia ring.

9. A machine according to claim 6 in which the spring is of helical form, extending around said second center in radially spaced relation thereto, the opposite ends of the spring being anchored respectively in said ring secured to the spindle and in the driver.

10. A machine according to claim 9 in which said ring secured to the spindle is screw-threaded to the spindle in such manner that it, together with the driver and the spring, can be removed from the spindle as a unit.

11. A machine according to claim 1 in which said spindle is journaled for rotation in a housing which is movable relative to the frame axially of the spindle, for effecting said relative axial motion of the spindle and the first center.

References Cited

UNITED STATES PATENTS

| 1,713,712 | 5/1929 | Philips | 192—103 X |
| 2,556,595 | 6/1951 | McNickle | 142—53 |
| 2,699,412 | 1/1955 | Adair et al. | 148—12.4 |
| 3,187,870 | 6/1965 | Sabatini | 192—46 X |

FOREIGN PATENTS 627,450  8/1949  Great Britain.

BENJAMIN W. WYCHE III, *Primary Examiner.*